Figure 1:
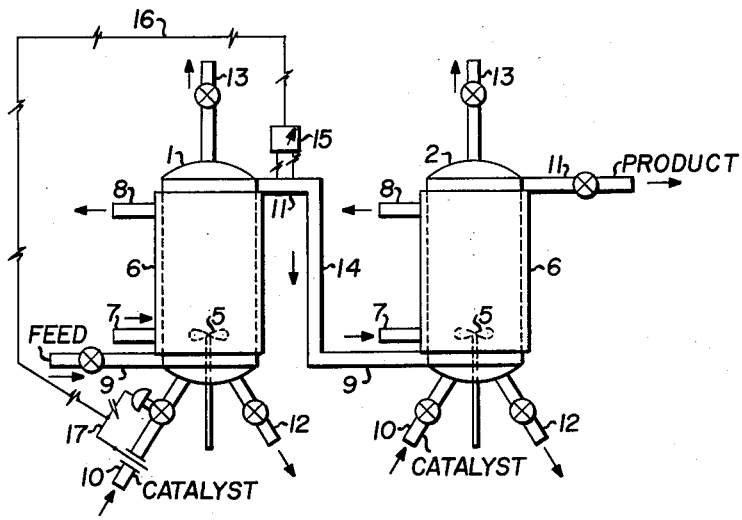

March 7, 1961 R. T. KELLEY 2,974,126
CONTROL OF DEGREE OF CONVERSION
Filed Aug. 9, 1955 3 Sheets-Sheet 1

Roland T. Kelley  Inventor

By  W. H. Smyers  Attorney

Roland T. Kelley  Inventor

By  W. H. Smyers  Attorney

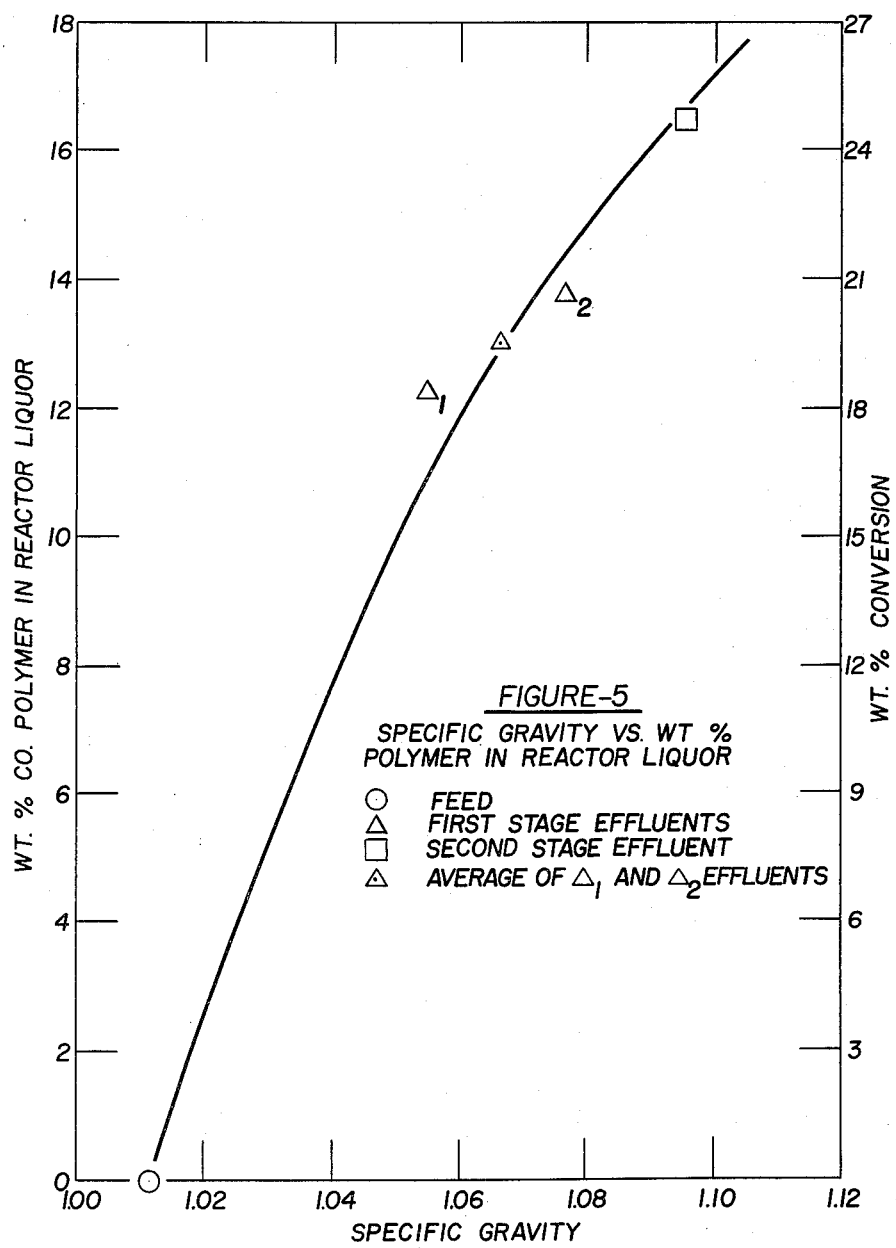

United States Patent Office 2,974,126
Patented Mar. 7, 1961

2,974,126

CONTROL OF DEGREE OF CONVERSION

Roland Timothy Kelley, Baton Rouge, La., assignor to Esso Research and Engineering Company, a corporation of Delaware Filed Aug. 9, 1955, Ser. No. 527,357

8 Claims. (Cl. 260—80.7)

This invention relates to the production of chemical products in which the density changes as a function of certain reaction conditions. On one aspect, the invention relates to the manufacturing of products, the density of which is a function of the degree of conversion, which in turn is a function of certain reaction conditions such as the addition of a catalyst thereto or a change in the temperature, etc.

More specifically, the present invention relates to a polymerization process wherein the degree of conversion is controlled as a function of the density of the reaction product.

Heretofore, it has been common practice in performing continuous polymerization processes to periodically sample an effluent stream or streams for reaction product-containing materials by recovering samples from said effluent or effluents at frequent intervals and determining the percent conversion in each sample by means of precipitating, drying, and weighing the polymer in the sample, etc. This has been tedious, expensive, and, due to high conversion rates resulting from high catalyst activities, etc., frequently ineffective. The present invention contemplates a means for obviating the above, on the basis of the fact that a shrinkage in volume and, as a result, a change in density of reactor contents occur.

Broadly stated, the invention contemplates controlling at least one of the reaction conditions affecting the degree of the conversion and hence the density of the reaction product as a function of changes in said density. For example, where changes in the amount of added catalyst, temperature, ratio of reactants, concentration of reactants, time of reaction, etc., appreciably affect the degree of conversion and also either raise or lower the density of the reaction product, such changes are, according to the present invention, controlled as hereinafter described.

The invention will be demonstrated hereinafter with reference to the accompanying drawing, in which:

Figures 1, 2, 3, and 4 are diagrammatic representations of apparatus suitable for use in the present invention; and Figure 5 is a graphical representation depicting the relationship between the density (in terms of specific gravity) and polymer content of various effluent streams.

While the present invention may be applied to a wide variety of processes, the invention has been found to be particularly advantageous for polymerization reactions because of the relatively large change in molecular weight and density of the reaction product as a function of the degree of polymerization.

The instant invention has found particular applicability for the control of the degree of conversion in catalytically promoted reactions such as catalytic-polymerization reactions or catalytic hydrocarbon conversion reactions where the amount of catalyst utilized, or the degree of activity of the catalyst, affects the degree of conversion. For example, in many catalytic cracking operations the density and molecular weight of certain reaction products is lower than the density of the feed, whereas for polymerization reactions the density and molecular weight is generally raised. In each instance, where catalysts are employed, either the amount of catalyst and/or the activity of the catalyst greatly affects the degree of conversion and the density and molecular weight of at least some of the reaction products.

It has further been found that by controlling at least one of the reaction conditions affecting the density of the reaction products in certain polymerization reactions, such as those involving the polymerization of $C_3$–$C_8$ olefins (especially $C_4$–$C_7$ iso-olefins, alone or especially with added vinyl aromatics with or without added multi-olefins and/or other materials copolymerizable with olefins and/or iso-olefins), the degree of conversion may be very accurately controlled in a continuous fashion, particularly whenever the polymer is obtained in dissolved form. In the above polymers, the vinyl aromatics such as styrene, homologues of styrene including alpha methyl styrene, para methyl styrene, alpha methyl para methyl styrene, may be replaced or augmented with minor proportions of indene-type materials or with minor proportions of acrylonitrile, methacrylonitrile, chloroacrylonitrile, methyl acrylate, methyl methacrylate, vinyl ketones, etc. To the above, may be added minor proportions of $C_4$–$C_{14}$ multi-olefins such as butadienes, piperylene, isoprene, dimethallyl, myrcene, etc. The particular solvents and catalysts to be used depend, of course, upon the particular monomers to be polymerized, as will be understood by those skilled in the art. For example, in the production of a tripolymer of iso-olefin-vinyl aromatic-acrylonitrile, a minor proportion of a peroxide catalyst such as benzoyl peroxide, sodium perborate, etc., may be added to a major proportion by weight of a Friedel-Crafts catalyst such as aluminum chloride. Water emulsifying of the monomer and catalyst in producing such a tripolymer would also be advantageous. Since the degree of conversion is desired to be controlled especially accurately in continuous processes and even more accurately for multi-stage continuous processes involving the above polymerization reactions, the present invention is particularly desirable for use in such continuous processes.

In a specific embodiment of the present invention, the degree of conversion to catalytic polymerization products in solution from $C_4$–$C_8$ iso-olefin-containing feeds is continuously controlled by installing in the effluent line or lines from the reactor or reactors a density-measuring instrument which continuously determines the density of said effluent. The rate of catalyst addition is then changed as a function of density measured, the ratio of a change in density for a corresponding change in degree of polymerization of the particular reactants having been previously determined. The determination may be by conventional laboratory procedure which is then advantageously graphically recorded for the specific polymer involved. Alternatively, a suitable calibration in the density-measuring instrument is made whereby to directly indicate the desirable catalyst addition rate.

In another embodiment of the present invention, the degree of conversion to catalytic polymerization products is controlled continuously by installing in at least some of the effluent line or lines from the reactor or reactors a combination recorder-controller instrument which (a) automatically determines the density, (b) is calibrated to convert the density reading to the corresponding degree of conversion and record the same, and (c) includes the necessary controlling means such as a solenoid and valve which automatically resets the rate of catalyst addition at the desired level.

Accordingly, one aspect of the present invention comprises installing in each effluent line from a plurality of reactors in series or in the effluent lines from all reactors or from all but the last reactor, a density-measuring instrument and controlling, as a function of the indications of said instrument, the reaction conditions. This may be accomplished manually or preferably automatically by employing in connection with said instrument means for automatically, and preferably continuously, controlling the amount of catalyst added and/or other reaction conditions such as the temperature of the reaction, concentration of reactants, reaction time, etc., or various combinations thereof. As above mentioned, the process of the present invention is particularly applicable for controlling amounts of catalyst addition in processes which either lower or raise the density and molecular weight of the materials involved such as by cracking or polymerization respectively.

Insofar as the density-measuring instrument is concerned, said instrument may be of any conventional type, such as of the pressure hydrometer or gamma-ray absorption type. Where the density-measuring instrument is of the pressure hydrometer type, such conventional instruments comprise a small pressure chamber containing a pressure hydrometer plummet therein. The liquid to be measured as to density continuously enters the chamber and floats the hydrometer plummet to a height which is a function of the density of said liquid. Depending upon the commercial type of instrument, various counter balances, weight chains, etc., are employed. The position of the plummet is advantageously determined by electrical means. The conventional gamma-ray absorption type of density meter useful for the invention continuously measures the absorption of gamma rays as a function of change in liquid density, said absorption increasing with an increase in density, which increase may be given directly by suitable calibration of the meter.

As above mentioned, these instruments may have optionally incorporated therein a conventional recorder-controller device. In the latter instance, the combination liquid density-measuring and recorder-controlling instruments may control such conditions as the catalyst addition rate, reaction temperature, concentration of reactants, etc. If the above density-measuring instruments of the pressure hydrometer type are used containing electrical means for continuously electrically determining the density in terms of a degree of an electrical function, said electrical degree is transmitted to a recorder which automatically resets one or more of the aforesaid conditions in a continuous manner. All of the above-mentioned instruments are preferably temperature compensated for additional accuracy.

It has further been found that for catalytic reactions involving the use of a metal containing polymerization catalyst such as metal alkyl type catalysts, Friedel-Crafts catalysts, including among others boron trifluoride, and especially aluminum halide catalysts, it is particularly advantageous to employ a recorder-controller instrument continuously regulating the catalyst addition rate as a function of the density of the product, since the conversion level may be thereby very closely controlled.

The rate of addition of some or all of the above catalysts is desirably controlled as above described, particularly for polymerization reactions for producing such polymers as the following or their equivalents, listed in their order of preference:

(a) Copolymers of $C_4$–$C_8$ iso-olefins (e.g., isobutylene) with vinyl aromatics (e.g., styrene) such as described, for example, in U.S. Patent 2,643,993;

(b) Tripolymers of $C_4$–$C_8$ iso-olefins (and/or olefins) with vinyl aromatics, with minor proportions of multi-olefins such as $C_4$–$C_{18}$ conjugated multi-olefins (e.g., isoprene, butadiene-1,3, etc.), such as described, for example, in U.S. 2,609,359; and (c) Homopolymers of $C_4$–$C_{10}$ iso-olefins, such as polyisobutylene, as described, for example, in U.S. Patents 2,235,127 and 2,374,272, etc.

In a more specific embodiment, the invention relates to a multi-stage process for manufacturing high molecular weight copolymers by low temperature Friedel-Crafts polymerization or at higher temperatures with other types of catalysts. A representative type of copolymer to which the invention may be applied is one made by copolymerizing materials containing at least one cyclic nucleus and especially a vinyl-aromatic (such as styrene) with a $C_4$–$C_8$ olefinic and especially iso-olefinic material (such as isobutylene).

In general, this process involves copolymerizing a mono-olefinic compound containing a cyclic nucleus, e.g., a vinyl aromatic such as styrene, and an alkene (preferably an iso-alkene) of about 3 to 5 carbon atoms, such as isobutylene, in the presence of a lower alkyl halide diluent such as methyl chloride or a saturated hydrocarbon, carbon disulfide, refined naphtha, mineral spirits, etc., at a temperature below about 32° F., e.g., −10° F. to −250° F., and preferably of about −60° F. to −150° F., with a Friedel-Crafts catalyst, such as aluminum chloride. The catalyst is preferably dissolved in an alkyl halide such as methyl chloride. The process may be carried out either batchwise or preferably continuously, and the resulting copolymer may be recovered by any desired means. One suitable method is to inject the cold reaction mixture consisting of polymer dissolved in the inert diluent, together with unreacted raw materials (if any) and residual catalyst (if any) into hot water with or without an added alcohol such as isopropyl alcohol in order to flash off volatile solvent and inactivate residual catalyst. By means of the above, it is also possible to produce a slurry of fine polymer solid particles suspended in water. The resulting solid polymer may range from a viscous fluid or a relatively stiff plastic mass to a hard or tough, thermoplastic resinous solid, depending chiefly upon the type and concentration of the catalyst, proportion of cyclic compound in the feed, temperature of polymerization, polymer yield, etc.

Various equivalent materials may be used. For instance, instead of styrene, one may use any of the above-listed vinyl aromatics and also p-ethyl styrene, various ethyl or other lower alkyl homologues of styrene, various ring-halogenated styrene homologues, or other cyclic materials which also polymerize in similar manner with isobutylene. Such latter materials include vinyl naphthalene, indene, dihydronaphthalene, etc. Instead of isobutylene, one may use other lower olefins, preferably iso-olefins such as methyl-2-butene-1; the lower normal olefins do not polymerize quite as readily by the low temperature Friedel-Crafts technique, but may be used if desired, particularly with higher catalyst concentrations. Although methyl chloride is the preferred lower alkyl halide for use as diluent-solvent, one may also use ethyl chloride, propyl chloride, certain of the low boiling fluorides, paraffins, naphtha, etc. As catalyst, the preferred material is aluminum chloride dissolved in methyl chloride, but one may also use metal alkyl type catalysts or boron fluoride or other active Friedel-Crafts catalyst, either alone or dissolved in a suitable solvent. U.S. Patent 2,274,749 describes copolymers of the general type referred to above, i.e., copolymers of $C_3$–$C_8$ iso-olefins, preferably $C_4$–$C_7$ iso-olefins (e.g., $C_3$–$C_7$) iso-olefins or $C_3$ or $C_4$ to $C_5$ iso-olefins such as isobutylene) and a vinyl-aromatic (such as styrene) and methods of preparing same, to which the present invention is applicable.

The process of the present invention is especially advantageous when applied to multi-stage continuous polymerization of this type of system in which the polymerizable reactants, diluent, and catalyst are continuously mixed together, advantageously in transfer lines, and injected into a plurality of reactors advantageously in series. In one instance, a partial conversion of about 30–70% (preferably about 40–60% by weight) is obtained in the first stage and the reaction mixture containing polymer and unreacted raw materials is then passed continuously, either by overflowing, pumping, or other suitable means into one or more additional reactors.

If a two-stage process is used, the second stage is generally run to about 90–100% conversion, whereas if a three-stage process is used, the second stage is advantageously run to a conversion of about 60–90% (preferably about 65–85%) and then in the third stage the conversion is as high as possible, e.g., 95–100%. If desired, a fourth stage may be used, in which case the third stage should be carried to a conversion of about 80–95% (preferably about 85–90%) and then the reaction completed as nearly as possible in the fourth stage. Three stages are generally sufficient. Further details may be found in U.S. 2,643,993 to B. R. Tegge. In controlling the reaction conditions and especially the amount or activity of the catalyst in such a multi-stage system in which, for example, three reactors are in series, the conditions are advantageously continuously controlled in at least the first two stages according to the present invention. Also, where the product quality is extremely critical, the reaction conditions in all of the stages may be continuously controlled according to the invention.

Referring to the drawing, in Figures 1, 2, 3, and 4 reference numerals 1, 2, 3, and 4 indicate polymerization reactors in the first, second, third, and fourth stage, respectively. Each reactor is advantageously equipped with an agitator 5, preferably of a high speed type capable of quickly mixing the liquid contents of the reactor. The reactors may be also provided with suitable cooling means, which is desirable unless temperatures substantially above normal may be tolerated or an internal refrigerant is used. The foregoing cooling means is illustrated as an external cooling jacket 6 in which a suitable refrigerant is injected through inlet 7 and withdrawn through outlet 8. Each reactor is also provided with an inlet 9 for all of the reaction liquid constituents except the catalyst, which latter is fed in through inlet 10 which may be situated in either an upper or lower portion of the reactor.

The polymerized reaction product is normally removed from each reactor through the overflow outlet 11. A drain outlet 12 is provided for emptying the contents of each reactor when the process is discontinued, either for occasion cleanouts, repairs, or other reasons. A vent 13 may be provided, either for use as a safety valve, or for use in removing and recycling gases or vapors, such as would be necessitated when employing an internal refrigerant. Conduits 14 serve to connect the discharge outlet 11 of one reactor to the feed inlet line of the reactor in the following stage. Numeral 15 designates a density-measuring instrument which is advantageously calibrated to convert the density reading directly into terms of percent conversion and may alternatively comprise a recorder-controller which electrically transmits electric impulses via wire 16 to solenoid actuated valve apparatus 17, which in turn resets the catalyst addition rate through catalyst inlet 10 to the reactor to control the conversion at the desired level.

The invention will be better understood from a consideration of the following example, wherein reference is made to the drawing.

*Example*

In the commercial production of a copolymer of 50% styrene with 50% isobutylene, the two reactants are mixed at 97.5° F. under sufficient pressure to maintain said reaction in the liquid phase, i.e. (advantageously at about 100 to 130 p.s.i.g.), at about 120 p.s.i.g. The methyl chloride is then blended with the mixture formed at said temperature. Alternatively the styrene and methyl chloride may be pre-mixed, regulated to 97.5° F. and blended with the isobutylene at said temperature.

The temperature of 97.5° F. is selected because the styrene and methyl chloride have the same density at 97.5° F., which renders the tertiary blend of the isobutylene, styrene, and methyl chloride easily handled as a binary mixture, and facilitates the continuous determination of the density of the blend formed to be correlated as a linear function to the volume flow rate and volume percent of each of the constituents in said blend.

If the tertiary mixture is of other materials than above (i.e., other vinyl aromatics, other $C_3$–$C_8$ (preferably $C_4$–$C_7$) iso-olefins, and alkyl chlorides), the mixing temperature will preferably be regulated at a specific level between about 70° F. and 120° F., depending upon the specific materials, said level being that at which two of the three components have the same density. If the amount of each component in the blend is not initially correct, the controlling means interconnected with the density-measuring instrument automatically resets the volume flow rate as a linear function of the changes desired in the density of the blend, the volume relationship, for example, at 97.5° F., of isobutylene to styrene, isobutylene and/or styrene to methyl chloride, styrene and methyl chloride to isobutylene, and isobutylene, styrene, or methyl chloride to a blend of these materials being a linear function of the density of the blend formed.

Figure 2:
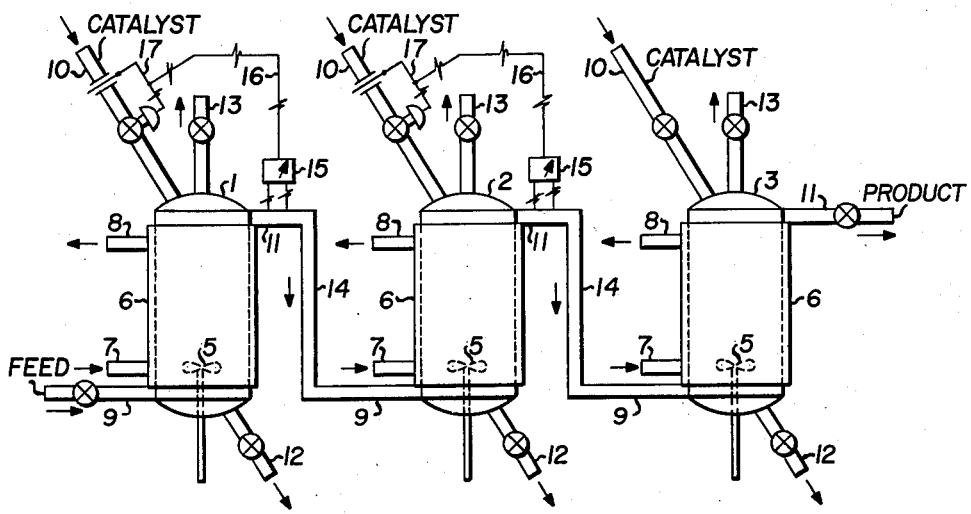
Figure 3:
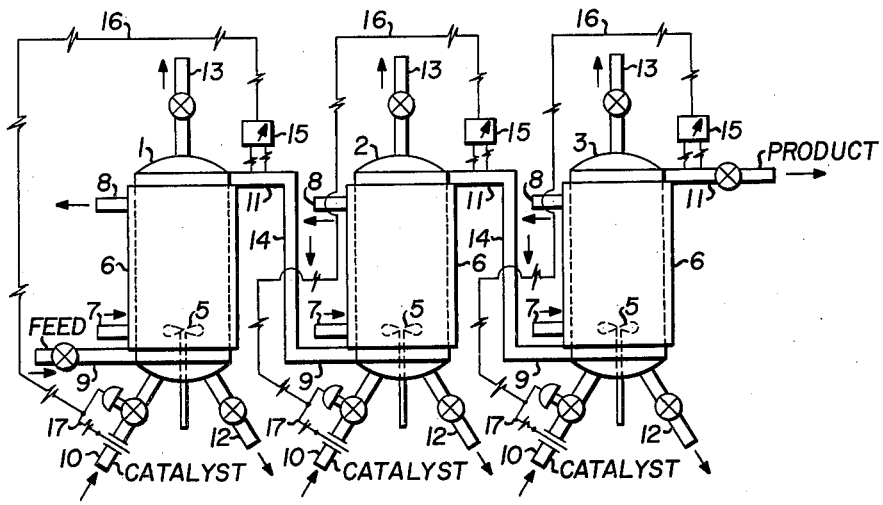
Figure 4:
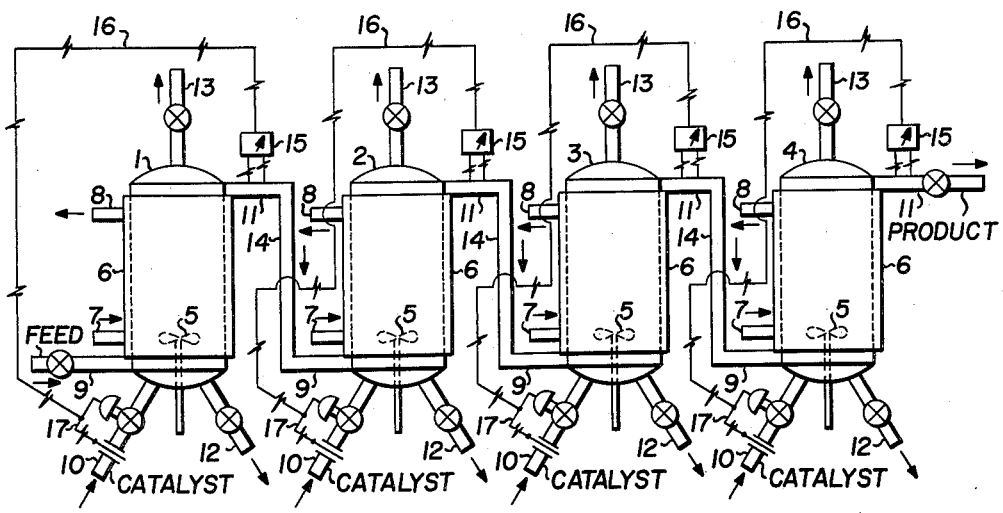

In the present specific example the reaction is carried out in a three-stage battery of reactors of the type shown in Figure 2. A 15 weight percent of polymerizable feed of 50% isobutylene and 50% styrene is used (balance 85 weight percent being methyl chloride diluent). After continuously blending the three above materials as hereinbefore indicated, the blend is cooled to −101.2° F., the reaction being conducted at about −94° F. to about −112° F. (e.g., −101.2° F.) in the first stage, at about −88° F. to about −92° F. (e.g., −90.4° F.) in the second stage, and at about −70° to about −82° F. (e.g., −76° F.) in the third stage. For any given polymer of isobutylene and styrene, the desired polymerization temperatures will differ. For example, a copolymer of 60% styrene and 40% isobutylene will require a slightly lower polymerization temperature in each of the three aforesaid stages as compared to a copolymer of 40% styrene and 60% isobutylene. The above ranges indicated, therefore, are not to be considered as all-inclusive for all materials, and obviously the closer the temperature control according to the present invention, the more uniform product will be obtained. A catalyst solution of aluminum chloride in methyl chloride is employed, having a concentration of about 0.07 gram per 100 cc. of methyl chloride.

The feed to the first stage is polymerized to the desired conversion level of 65–75%, i.e., 70%, by the addition thereto of 15–20%, e.g., 17.5%, based on reactants, of the aforesaid aluminum chloride as the catalyst. The effluent from the first stage enters the second reactor, where either additional styrene and/or isobutylene may be added as desired (1.5% styrene is added in the present case), the catalyst concentration based on reactants being 22–27% (e.g., 25%). The reaction is then carried to the desired second stage conversion level (using a catalyst concentration of 30–50% (e.g., 40%) based on reactants) of about 90–97%, i.e., 95%. The effluent from the second stage is then conducted to the third reactor where the reaction is carried to completion, i.e., 100%, by the addition of excess catalyst. In the particular equipment employed, each reactor holds about 14,000 pounds of reactants and diluent.

The conversion level in each reactor is controlled by adjusting the flow of catalyst to the reactor automatically according to the present invention by means of a recorder-controller instrument of the pressure hydrometer type hereinbefore described installed in the effluent lines from the first two reactors. The recorder-controller instrument regulates the amount of catalyst employed as a linear function of the density of each effluent product formed, i.e., on a ratio of pounds of polymer per pound of catalyst to 3,000 in the first stage and 5,000 in the second stage. In each of these stages the conversion control is very critical in order to obtain a commercially acceptable product insofar as the physical characteristics of the polymer are concerned. The amount of catalyst in the third stage is preferably in excess of that required, i.e., 8,000 pounds of polymer per pound of catalyst, to insure that 100% conversion is reached.

Referring now to Figure 5, it can be seen that the specific gravity (density) of the reaction mixture containing substantially no polymer is 1.011. By means of a liquid density-measuring instrument of the hydrometer or gamma ray adsorption type, the reaction conversion level is maintained as above mentioned in the first stage at 65–75%, in the second stage at 90–97%, and proceeds in the third stage to 100%. By reference to Figure 5, it can be seen that the specific gravity of the effluent leaving the first stage is regulated between about 1.057 and about 1.075 (e.g., 1.066) and the specific gravity of the effluent leaving the second stage is regulated at about 1.096 by means of controlling the catalyst addition rate in accordance with the present invention. The above increases in density (specific gravity) are not only the result of a formation of the amounts of polymer indicated in Figure 5, but are additionally caused by a shrinkage in volume which also contributed to the change in density of the reactor contents.

Control of the reactor stage conversion levels in the production of such isobutylene-styrene copolymers as above has been heretofore one of the most troublesome phases of the process, since conversion control to within ±5% (preferably ±2%) of the conversion levels is highly desirable if the final product is to meet all specifications consistently. The use of the above process of the present invention has eliminated the necessity of hourly sampling the effluent stream or streams and determining the percent conversion by precipitating, drying, and weighing the polymer in the sample.

While there are above described a number of specific embodiments of the present invention, it is obviously possible to produce other embodiments and various equivalent modifications and variations thereof without departing from the spirit of the invention or the scope of the appended claims.

What is claimed is:

1. In a continuous catalytic polymerization process wherein the polymer density is greater than the density of reactants mixture and is a proportional function of the amount of added catalyst, said polymerization being at a temperature between about −76° and about −112° F. and, in at least one stage, said reactants mixture comprising a diluent and an admixture of a $C_3$–$C_8$ olefin with a monomer selected from the group consisting of a vinyl aromatic hydrocarbon, a halogated vinyl aromatic hydrocarbon, a $C_4$–$C_{14}$ multiolefin, and mixtures thereof, the diluent comprising an alkyl halide which is a solvent for the resulting polymer, at least two of said members of said reactants mixture having approximately the same density at a specific temperature level between about 70° and about 120° F., the improvement which comprises mixing said members for introduction to the first polymerization stage at said temperature level, blending therewith sufficient amounts of the remaining members of said reactants mixture to give a predetermined density of the blend formed at said temperature level, cooling the blend to between about +32° F. to about −250° F., and thereafter continuously regulating the catalyst addition rate to at least the first stage in proportion to changes in density of the reaction mixture containing polymer product withdrawn therefrom and measured at said temperature level of between about 70° and about 120° F., the higher the catalyst condition rate, the higher the resulting density.

2. Process according to claim 1 wherein the olefin is isobutylene, the vinyl aromatic hydrocarbon being styrene, the polymerization being in the presence of a methyl chloride diluent, the polymerization temperature being between about −60° F. to −150° F., at least three reactor stages being employed in series, the polymer density being continuously and automatically measured in the effluent lines from at least the first two reactors at a temperature level of about 97.5° F. where the styrene and methyl chloride have the same density, the catalyst addition rate to said stages being controlled as a function of changes in said density whereby to continuously and automatically control the conversion level therein.

3. Process according to claim 1 in which the reactants comprise about 30–100 parts isobutylene, about 40–70 parts styrene, and about 0–30 parts of a member selected from the group consisting of isoprene, butadiene, piperylene, myrcene, dimethallyl, and mixtures thereof; the rate of catalyst addition to said stages being controlled as a function of said densities of the polymer produced from each respective stage and measured at a temperature level of between about −60° F. and about +200° F.

4. In the process for the continuous polymerization of high molecular weight copolymers of about 40–70% styrene and about 60–30% isobutylene by weight, in the presence of methyl chloride as polymerization diluent, at a polymerization temperature below about −60° F. with a Friedel-Crafts catalyst, the improvement which comprises continuously admixing the styrene with the isobutylene, both in the liquid phase, at a temperature level of about 97.5° F., at which temperature level the density of styrene and methyl chloride is the same, blending the mixture formed with liquid methyl chloride at substantially said temperature level, continuously and automatically adjusting the proportions thereof as a direct function of the density of the blend formed until the blend has a predetermined density at said level, cooling said blend at least to said polymerization temperature, adding thereto a polymerization catalyst to effect copolymerization, and continuously controlling the rate of catalyst addition as a proportional function of the density of the resulting copolymer-containing reaction mixture, said density being measured at a temperature level of about 97.5° F. so as to control the degree of conversion.

5. Process according to claim 1 in which the polymerization reactants comprise a $C_4$–$C_8$ isoolefin, a vinyl aromatic, and a minor proportion of a $C_4$–$C_{14}$ conjugated multiolefin, the resulting product formed being a tripolymer thereof.

6. Process according to claim 1 in which the polymerization reactants consist essentially of isobutylene and styrene.

7. Process according to claim 1 in which the polymerization reactants comprise essentially isobutylene and multi-olefin and the resulting product formed is a copolymer thereof.

8. In a continuous catalytic polymerization process wherein the polymer density is greater than the density of the reactants mixture, wherein said polymerization is effected at a temperature between −10° F. to −250° F., said reactants mixture comprising an alkyl halide diluent and an admixture of a $C_3$ to $C_8$ olefin with a monomer selected from the group consisting of a vinyl aromatic hydrocarbon, a halogenated vinyl aromatic hydrocarbon, a $C_4$ to $C_{14}$ multiolefin, and mixtures thereof, at least two of the members of said reactants mixture having approximately the same density at a specific temperature level between 70° and about 120° F., the improvement which comprises mixing said members of said reactants mixture at the temperature level between 70° and 120° F. at which two of said members have approximately the same density, and controlling the relative proportions of said members as a function of the density measured at said temperature level.

(References on following page)

References Cited in the file of this patent

UNITED STATES PATENTS

| | | |
|---|---|---|
| 2,530,409 | Stober et al. | Nov. 21, 1950 |
| 2,537,031 | Chaney | Jan. 9, 1951 |
| 2,643,993 | Tegge | June 30, 1953 |

FOREIGN PATENTS

| | | |
|---|---|---|
| 697,991 | British | Oct. 7, 1953 |

OTHER REFERENCES

Breitenbach et al.: Ber., 69, 1107 (1936).

Starkweather et al.: J. Amer. Chem. Soc., 52, 4708 (1930).

D'Alelio: Fundamental Principles of Polymerization, pp. 281–289, 437–438, John Wiley (1952).